United States Patent Office 3,156,677
Patented Nov. 10, 1964

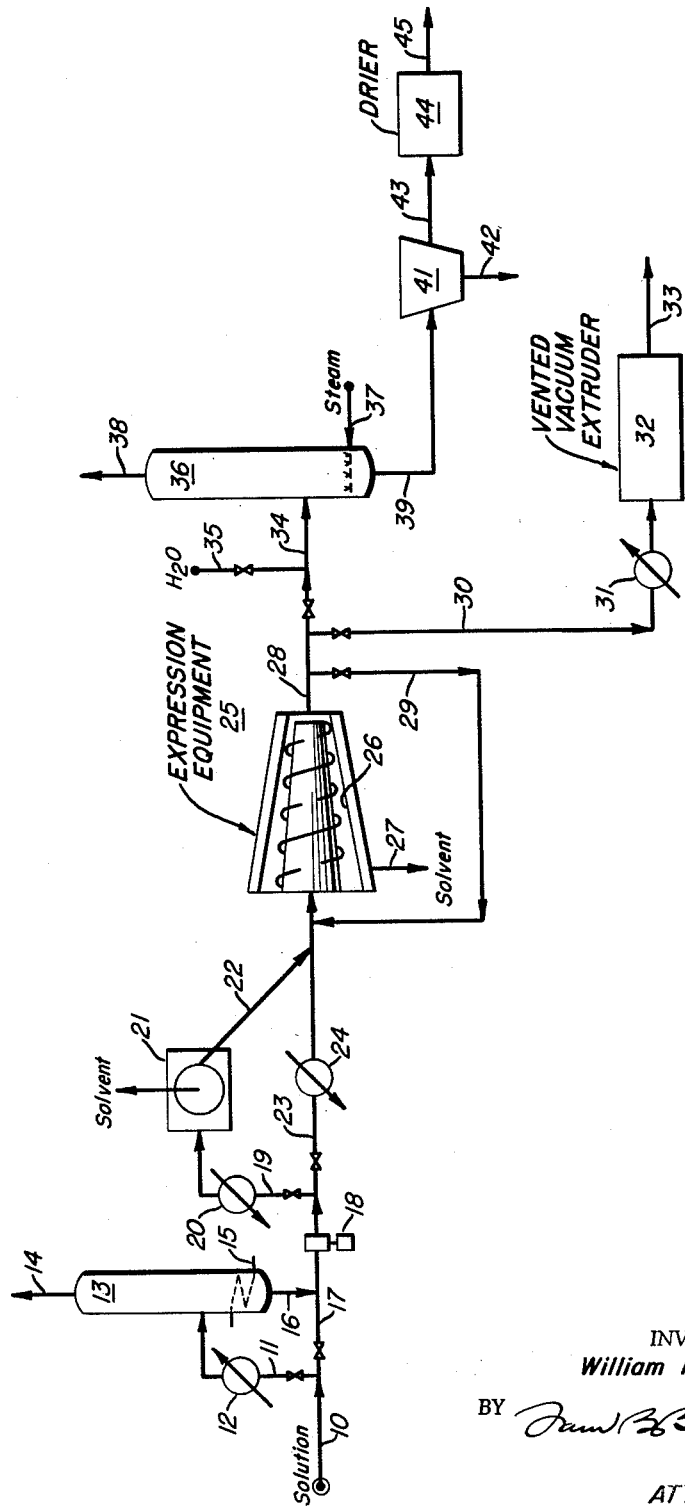

3,156,677
RESINOUS POLYOLEFIN TREATMENT
William Resnick, Haifa, Israel, assignor to Standard Oil Company, Chicago, Ill., a corporation of Indiana
Filed Dec. 21, 1962, Ser. No. 247,794
13 Claims. (Cl. 260—88.2)

This invention relates to methods for the purification and concentration of resinous polymers of olefins, particularly the relatively high density (about 0.94 to 0.98 gram per cc. inclusive, at 23° C.), essentially linear resins produced from ethylene as solutions in inert solvents, such as saturated naphthas.

Processes are now being commercialized in which ethylene or ethylene-propylene feed stocks are polymerized at relatively high temperatures in the presence of granular or powdered catalysts comprising various supported oxides of transition metals, for example, supported oxides of chromium and/or molybdenum. Processes of this character have been described, for example, in U.S. Letters Patent 2,691,647; 2,692,257; 2,731,452–3; and by Alfred Clark, J. P. Hogan, R. L. Banks and W. C. Lanning, Ind. Eng. Chem. 48, 1152–5 (July 1956). Other processes for the polymerization of ethylene or propylene, alone or copolymerized with minor amounts of other olefinic hydrocarbons, use catalysts obtained from the organometallic compounds and salts (as distinct from oxides) of metals in Groups IV, V and VI of the Periodic Table. Such other processes are described, for instance, in Belgian Patents Nos. 533,362, 534,792 and 534,888.

In these and other processes of similar character, the effluent of the polymerization reactor is a solution of resinous polymer in the reaction solvent, which is usually a liquid hydrocarbon or hydrocarbon mixture, containing also substantial proportions up to about 20% by weight, based on resinous polymer, of grease-like and waxy polymers and solid catalyst particles. In either batch or continuous polymerization processes of the aforesaid character, the concentration of resinous polymer can vary from about 2 to about 40%, often in the range of about 10 to 35%, by weight of the reactor effluent solution.

The catalyst particles are removed from the hot reactor effluent solution by efficient filtration, centrifugation, or both, and thereafter the solution is treated to recover the resinous polymer from solvent and greasy or waxy polymers. To this end, the solution is cooled and filtered to recover a semi-solid composite of resin, wax, grease and solvent, the latter usually comprising about 50 to about 90 percent by weight of the filter cake. Then, polymer recovery is effected by distilling the solvent from the filter cake and recovering a melt of resinous and greasy (or waxy) polymer. The melt is cooled and extracted in one or more stages with a hot solvent to remove greases and waxes. Thereafter solvent is steam-distilled from the resinous polymer and the resinous polymer is then dried.

The known techniques of resinous polymer concentration and purification suffer various economic and technical disadvantages. Thus, removal of the large proportion of solvent from the filter cake is expensive and the melt must be held in the solvent still for relatively long periods of time (e.g., one hour) at relatively high temperatures (usually about 190 to about 210° C.), resulting in some discoloration of the resinous polymer and in some thermal decomposition thereof. In addition, removal of solvent by distillation leaves a residue of greasy and waxy polymers in the resinous polymer and special dewaxing or degreasing treatment of the resinous polymer becomes necessary. While small proportions, say up to about 2 or 3% by weight of grease or wax, in the resinous polymer can be tolerated and may, in some instances, be desired because of plasticizing action, the inclusion of larger proportions can result in burning and flashing during injection molding of the resinous polymer.

Accordingly, one object of my invention is to provide an improved method for the recovery and simultaneous purification of resinous polymers of olefins, particularly of ethylene, propylene, ethylene-propylene and the like. Another object is to provide a novel method for simultaneously dewaxing and/or degreasing resinous polyethylene gels and removing solvent therefrom in the liquid condition. An additional object is to provide a method for recovering a resinous polymer of ethylene or the like from a viscous solution of gel thereof in a liquid hydrocarbon solvent at a low temperature, whereby to prevent thermal decomposition and formation of colored materials in said polymer. These and other objects of my invention will become apparent from the ensuing description thereof and from the appended figure.

Briefly, my invention comprises compressing a gel or semi-solid mixture of a resinous polymer of an olefin, associated with lower molecular weight greasy and/or waxy polymers, under suitable conditions to express a substantial proportion of liquid solvent and greasy and/or waxy polymer therefrom. The compression is effected at temperatures substantially below the boiling range of the solvent and below the melting range of the resinous polymer. Compression is usually effected at about room temperature, although elevated temperatures up to about 60 or 70° C. or higher can be used, bearing in mind the two criteria set forth above. The pressures in the compression operation can range from about 25 to about 2000 p.s.i.g. or even much higher, if desired. However, I have found that pressures of even 100 p.s.i.g. are effective for the expression of solvent from resinous polyethylene gels at about 27° C. The hydrocarbon solvent functions as a selective solvent for greasy and waxy polymers, particularly if expression is effected in a continuous rotary, mechanical screw press which subjects the polymer to both compression and tearing action, so these lower molecular weight polymers are recovered in large measure with the solvent and can be separated from the solvent, if desired.

The expression of solvent in relatively low molecular weight polymers from the resinous polymers can be effected in batch or continuous expression equipment such as has heretofore been employed in the expression of oil from seeds in the vegetable oil industry, using hydraulic plate presses, cage presses, or continuous screw presses or their equivalents, or the like (note A. E. Bailey, "Industrial Oil and Fat Products," 2nd ed., Interscience Publishers, Inc., New York (1951), pp. 566–576). Expression can also be effected in rubber processing steel rolls or other similar equipment. Expression can be effected in a housing supplied with an atmosphere of inert gas, such as nitrogen.

By the term "resinous polymers" I intend to denote polymers which have high molecular weights ($\overline{M}_w$, average) of at least about 10,000, but which can extend up to several million. Thus, suitable resinous polyethylenes have intrinsic viscosities of at least one in decahydronaphthalene at 130° C. Polyethylene waxes can range from polymers containing 24 carbon atoms per molecule to molecular mixtures whose intrinsic viscosity is below about one, say at most about 0.75, in decahydronaphthalene at 130° C. Grease-like polymers of ethylene can have molecular weights as low as about 250 (number average) and can extend up to multi-branched molecules having number average molecular weights to about 1000. A typical greasy polyethylene is characterized by the presence of a multiplicity of ethylenic bonds and branch points, densities at 23° C. between about 0.8 and 0.9 and melting points in the range of about 50 to 65° C.

Waxy polyethylenes can have melting points in the range of about 75 to 100° C.

The following table provides values of the solubilities of certain grease-like polyethylenes in benzene and mineral spirits at various temperatures. By the process of the present invention, the grease concentration of the polyethylene or other polymer feed stock can be controlled not only by the extent of mechanical expression of solvent therefrom but also by elevating the temperature to attain higher grease solubility in the solvent being expressed from the polymer feed stock.

TABLE

| Temp., ° C. | Grease Solubility in— | |
|---|---|---|
| | Benzene (g./100 g.) | Mineral Spirits (g./100 g.) |
| 20 | 0.34 | 0.19 |
| 30 | 1.25 | 0.69 |
| 40 | 4.5 | 2.5 |
| 50 | 12 | 6.6 |
| 60 | 60 | 33 |
| 64 | Miscible | Miscible |

This invention finds a very useful application to resinous, essentially linear polymers of ethylene of the character set forth having densities (g./cc. at 23° C.) of about 0.94 to 0.98 when annealed by methods known in the art and melt viscosities at 145° C. between about $10^5$ and about $10^8$ poises (method of Dienes and Klemm, J. Appl. Phys. 17, 485 (1946)). The linear resinous polyethylenes can contain up to about 15 or 20% by weight of waxy or greasy polymers of ethylene which are preferentially soluble in hydrocarbon solvents such as decane, benzene, xylenes, mineral spirits (a saturated naphtha having a boiling range between about 165 and about 190° C. which has been treated in sequence with concentrated and fuming sulfuric acid to remove aromatic hydrocarbons and olefins) at temperatures between about 40° C. and 100° C., at which the resinous polyethylene is essentially insoluble in these solvents.

Resinous polypropylenes can be amorphous or rubbery materials, crystalline materials or, most often, mixtures of both. Rubbery, resinous polypropylenes can have intrinsic viscosities of about 0.8 to 1 in decahydronaphthalene at 130° C. and isotactic or crystalline polypropylenes can have intrinsic viscosities (as defined above) extending up to about 10, for example, about 7 or 8. In addition, the high molecular weight polypropylenes can contain relatively light oils boiling below about 500° C. and amorphous polypropylenes having molecular weights greater than those of the light oils and extending up to about 5000 or 6000 (weight average).

Resinous copolymers of ethylene and propylene, produced by processes of the character aforesaid, have properties intermediate those of polyethylene and polypropylene.

The process of my invention can also be applied to rubbery copolymers prepared from alkenes such as ethylene and/or propylene with minor proportions by weight up to about 30 w. percent, based on alkenes, of conjugated alkadienes such as 1,3-butadiene or isoprene.

Reference is made to the accompanying figure in order to illustrate my invention but not necessarily to delimit or restrict the same. The figure will be explained with reference to an operation on polymers of ethylene, but it will be understood that this is merely illustrative and that other resinous polyolefins can be treated in substantially identical fashion or with such modifications as will be readily apparent to one skilled in the art.

A solution of polymers of ethylene in a solvent such as odorless naphtha (a naphtha fraction boiling in the range of about 188 to 210° C. which has been heavily treated with concentrated sulfuric acid) is introduced through line 10. This solution has previously been treated by filtration, centrifugation or other methods to remove catalyst particles therefrom. The temperature of the solution lies within the range of about 170 to about 190° C. The total polyethylene concentration in the solution may range from about 2 to about 35% or perhaps 40% by weight depending upon the catalyst and process conditions used in the polymerization reaction. If the polyethylene concentration is relatively dilute, on the order of about 5%, or less, and depending upon the type of hereinafter described equipment 25 used in the plant, the solution is advantageously diverted through valved line 11 and heater 12 into a solvent distillation zone 13 provided with a take-off line 14 for solvent and a reboiler 15. Sufficient solvent is withdrawn from the relatively dilute solution to increase the concentration of polyethylene to about 10 to 40% by weight of the solution, preferably from about 12 to 35% by weight, and advantageously to 15–30% by weight. A polymer melt is formed in the lower portion of tower 13. Depending upon the concentration and molecular weight of the polyethylene in said melt, it may have a melting range extending from room temperature to about 120° C. The viscous melt is withdrawn from tower 13 through line 16 to enter line 17.

The polyethylene solution may contain a sufficiently high concentration of polyethylene to avoid the need for using solvent still 13, for example, between about 10 and about 40% by weight of polyethylene. In this event, the solution is passed from line 10 directly into line 17.

If the concentration of polyethylene resin in the solution in line 17 is below about 10% by weight, it is pumped in one embodiment of the process here described, by a suitable pump 18 through valved line 19 and cooler 20 to a filter schematically depicted at 21. A suitable filter is a continuous rotary vacuum filter or a horizontal pan filter or other equivalent filtering devices which are known in the art. The filtration treatment produces a polyethylene cake containing about 10 to about 40% or slightly more by weight of polyethylene and the remainder, the solvent naphtha. The filtration can be conveniently effected at temperatures in the range of about 25 to about 60° C. The filter cake is recovered from the filter by conventional means and transported by conventional means such as a flight conveyor schematically depicted by line 22 for entry into equipment adapted to express most of the remaining solvent and greasy or waxy polymer from the resinous polyethylene.

If the solution in line 17 already has a polyethylene concentration between about 10 and about 40% to 45% by weight, it is pumped by pump 18 directly into valved line 23 and cooler 24 to enter the solvent expression equipment indicated schematically at 25. Cooler 24 may comprise a simple indirect heat exchange apparatus, or a moving body of relatively cool water in which the cooled or quenched polymer is cut into small particles or coleslaw-like shreds by moving blades.

Equipment 25 can suitably be a continuous mechanical screw press or equivalent batch or continuous oil expression device and is usually operated at temperatures between about 25 and 60° C. and exerts a pressure of at least about 25 p.s.i.g., but which may apply several thousand pounds, for example, about 3000 to about 8000 p.s.i.g. to the polymer gel. The gel which is charged to the expression equipment is torn and compressed in a continuous mechanical screw press having a discontinuous flight, for example, in the well known V. D. Anderson Expeller (registered trademark) and the polyethylene resin concentrate is moved forward and solvent is removed through the interstices in a wall made of closely fitting cylindrical pieces of metal 26. Solvent is removed in the liquid condition from the expression equipment through line 27.

The time of residence of the polymer in the expression equipment can range from 1 minute to 10 minutes or even more, depending upon the type of equipment which is used, and is in general not a critical variable in my process. Residence times of 1–3 minutes are feasible and preferable in mechanical screw expellers. The pressed resin is withdrawn from the expression equipment 25 by means of a flight conveyor 28 or other suitable equipment, whence a part thereof may be recycled via suitable conveying equipment indicated by valved line 29 for recycle through the mechanical expression equipment. The operations can be conducted so that the concentration of polyethylene resin in the pressed material in conveyor 28 ranges between about 50 and about 95% by weight, preferably at least about 80 w. percent, the remainder being largely solvent naphtha. The ratio by weight of recycle resin to feed gel can range from about 0.1 to 1. The pressed resin can be passed by suitable transporting equipment shown merely as valved line 30 and heater 31 to suitable drying equipment indicated schematically by the box 32, for example, a vented vacuum chamber, a rotary drier, or the like, whence it is discharged by line 33 to chopping and bagging equipment.

Alternatively, the pressed resin can be passed into valved conveyor 34 in which it is mixed with water charged through valved line 35, thence to a steam still 36 provided with a steam inlet line 37 and take-off line 38. A slurry of about 10% by weight of resinous polyethylene in water is withdrawn through line 39 to a centrifuge or filter or equivalent device 41, from which the bulk of the water is removed through line 42 and the dewatered resin is removed through a conveyor 43 for passage to drying equipment schematically indicated at 44. Equipment 44 may be a steam tube drier, a tray drier, a vented vacuum extruder or equivalent drying device. The dried polyethylene resin is removed from 44 by a conveyor 45 for chopping and bagging.

If desired, carbon black or fillers or antioxidants can be added to the polyethylene gel in advance of the expressing equipment 25.

The following specific examples are introduced to illustrate my invention without unduly limiting the same.

Example 1

The feasibility of the technique of expression of solvent and grease from a polyethylene resin was tested in the laboratory by the following method. A steel pipe of ¼-inch I.D. by about 1¼-inch long fitted with a micrometallic porous disc at one end was filled with a resinous polyethylene-hydrocarbon solvent gel containing 5.3% by weight of polyethylene. Hydraulic pressure was applied to the gel by means of a ¼-inch diameter plunger, being about 200 p.s.i.g. Solvent drained through the porous disc and the solid-appearing material remaining in the pipe after the expression treatment contained 34% by weight of polymer. It can be calculated that upwards of 90% by weight of the original solvent had been removed from the polyethylene gel by the above-described treatment.

Example 2

Using the same polyethylene gel as in Example 1 and a hydraulic molding machine usually employed for preparing polymer pellets, a pressure to 2000 p.s.i.g. was applied to the gel and solvent escaped from the interstices in the mold cavity. This high pressure does not seem to be necessary since the bulk of the solvent can be removed at pressures under 100 p.s.i.g. The polymer pellet removed from the mold after expression contained 35.5% by weight of polymer, showing again that more than 90% by weight of the original solvent had been removed from the gel feed stock.

Example 3

Polyethylene resin was produced in a continuous reactor by polymerization in odorless naphtha (B.R. 370–410° F.) using microspheres of a commercial 8 w. percent $MoO_3$ supported on activated alumina which had been reduced with hydrogen at 485° C. and atmospheric pressure. The reactor also contained about 50 w. percent sodium, based on the molybdena-alumina catalyst. Polymerization was conducted at about 255° C. and an ethylene pressure of about 1000 p.s.i. The reactor effluent was a solution containing 1% by weight of polyethylene, from which catalyst was removed by the use of an efficient pre-coated filter, whence the solution was transferred to a solvent still to concentrate to a melt and the resultant melt was cooled, then vacuum-filtered through a filter medium. The melt contained 4.9 w. percent of resinous polymer, 0.7 w. percent of waxy and greasy polymers (hexane-extractables) and the remainder naphtha.

Hexane-extractables are determined by placing the polymer slurry in a Soxhlet extractor and extracting with refluxing n-hexane to exhaustion. Solvent is recovered from the extractor bowl and is evaporated to remove the hexane, following which the residue is evaporated to 410° F. to remove all the solvent. The remainder is the hexane-extractable fraction.

The polymer recovered from the filtration was a semisolid cake whose composition was 12.4 w. percent resinous polymer, 1.7 w. percent of waxy and greasy polymers and the remainder naphtha. Thus, the concentration of hexane-extractables was substantially the same in the melt and the filter cake (12.5 and 12% by weight, respectively). The filter cake was pressed readily in a midget V. D. Anderson Company Expeller (registered trademark), a continuous mechanical screw press employing discontinuous flights. The pressing occurred at substantially room temperature. The pressed polymer was dry to the touch and powdered easily. The composition of the pressed polymer was 55.6 w. percent resinous polyethylene, 0.8 w. percent hexane-extractables (greases and waxes) and 43.6 w. percent naphtha. The pressed polymer was washed thoroughly with acetone and dried at 80° C. under 26 millimeters of mercury to yield a polymer having the specific viscosity of 0.359 (measured on 0.1 g. of polymer per 100 ml. Decalin at 130° C.) and density at 23° C. of 0.9806 g. per cubic centimeter. Accordingly, it can be calculated that 95% by weight of the grease and 95.8% by weight of the solvent were removed in the expression treatment, employing the following equations:

$$S_1 = \frac{S_i - S_f}{S_i} \times 100$$

$$S_f = \frac{\text{g. polymer}}{C_f} - \text{g. polymer}$$

Definitions:
(a) $S_1$ = percent of original solvent lost in pressing.
(b) $S_i$ = g. of initial solvent.
(c) $S_f$ = g. of final solvent.
(d) g. polymer = grams of polymer in original gel.
(e) percent polymer is equal to percent of total wt. of solvent+polymer.
(f) $C_f$ = wt. fraction (w. percent/100) of polymer in pressed gel.

Example 4

Ethylene was polymerized in a continuous reactor in mineral spirits solvent (boiling range 310 to 390° F.) using a catalyst of 3.7 w. percent of cobalt oxide, 12.1 w. percent of $MoO_3$ and the remainder an activated (gamma) alumina, which was not prereduced before use. Calcium hydride was employed in a weight ratio of one to the aforesaid catalyst. The polymerization was conducted at 265° C. and a pressure of 1000 p.s.i.g. The mineral spirits effluent from the reactor contained approximately 1% by weight of polyethylene in solution, which was filtered hot to remove fine catalyst particles, thereafter cooled to about room temperature to produce a polyethylene slurry which was filtered on a conventional filter to produce a cake containing 20 w. percent polyethylene and 80 w. percent mineral spirits. The filter cake was then subjected to mechanical expression of solvent in a mechanical expressing machine (V. D. Anderson Company Expeller, registered trademark, capable of producing 6 to 8 tons per day of pressed filter cake). The pressed filter cake was found to contain 92.4 w. percent of tough, resinous polyethylene, about 1.8 w. percent of hexane-extractables and about 5.8 w. percent of mineral spirits.

*Example 5*

A 1 w. percent solution of resinous, crystalline polypropylene in mineral spirits was cooled from 285° F. to room temperature to precipitate the polymer. The resultant slurry was filtered on a vacuum filter and the filter cake was pressed as in Example 2 under pressures in the range of 4000 to 6000 p.s.i.g. This treatment increased the polymer concentration in the filter cake from 5.91 w. percent to 9.25 w. percent in the mechanically expressed cake. The mechanical expression therefore removed about 40 w. percent of the solvent from the filter cake in this operation.

*Examples 6–10*

The feasibility of my invention has been further demonstrated using a mechanical screw-type expeller (from the V. D. Anderson Company, their Model 5A) characterized by having a 12 inch I.D. barrel 44 inches long. The polymer feed was made by polymerizing ethylene at temperatures in the range of 250°–290° C. using a catalyst comprising about 9% molybdena supported on alumina promoted with sodium and in mineral spirits as solvent. Illustrative data are tabulated below. In the table, polymer melt index is based on finished polymers after removal of any solvent remaining after the expelling operation. The polymer-solvent gel which comprised the expeller feed was in the form of either thick flakes or in shreds (which were rather like coleslaw in appearance) and had been cooled to about 30–40° C. The temperature of the expeller liquor, which is the expelled solvent and polymer grease, is noted to illustrate the rise in temperature resulting from the conversion of mechanical energy into heat energy.

| Polymer Melt Index | Polymer Concentration, Percent | | Expeller Liquor Temperature, ° C. |
| --- | --- | --- | --- |
| | Expeller Feed | Expeller Product | |
| 5 | 33–37 | 55–65 | 58–62 |
| 5 | 43 | 69 | 60 |
| 5 | 40 | 59 | 63 |
| ½ | 23 | 61 | 62 |
| ½ | 16 | 55 | 64 |

Little resinous polymer was lost to the polymer liquor. By a simple arithmetical material balance calculation, it will be observed from 50% to as much as 84% of the solvent in the expeller feed was removed.

*Example 11*

In another operation, using an expeller having a 6 inch I.D. barrel 33 inches long, a polymer having a melt index of one, prepared as described immediately above, was expelled. The expeller feed was at room temperature, contained 31.4 weight percent polymer, 67.4% solvent and 1.2% water, and was in the form of small spheres. The expeller product contained 76% polymer and 24% solvent.

*Example 12*

In other operations conducted on similarly-prepared polyethylene having a melt index of six and a density of 0.967 gram per milliliter, the expeller feed contained 28% by weight polyethylene and 2.4% oven volatiles. The expelling was done on a screw-type expeller having a 6 inch I.D. barrel 33 inches long. The expelled product contained 75% resinous polyethylene, and only 0.3% oven volatiles. As used above, the amount of oven volatiles was determined as the percentage weight loss from a small sample, about 2 to 5 grams, during three hours residence in an oven maintained at 150° C. and an absolute pressure of not more than 3 millimeters of mercury. This application is a continuation in part of application Serial No. 696,671 filed Nov. 15, 1957 and now abandoned.

Having thus described my invention, what I claim is:

1. A process for separating a resinous polymer of a normally gaseous olefin from a solution of said polymer in a normally liquid hydrocarbon solvent, which solution contains up to 20% by weight, based on the weight of dissolved resinous polymer, of grease-to-wax like polymer of said olefin preferentially soluble in said solvent which process comprises the steps of cooling said solution to form a polymer gel containing substantially all of the resinous polymer and grease-to-wax like polymer contained in said solution, subjecting said gel to mechanical compression to express a liquid which is a solution of said grease-to-wax like polymer in said hydrocarbon solvent and recovering a resinous polymer concentrate thus produced containing a substantially lower ratio, on a weight basis, of grease-to-wax like polymer to resinous polymer than initially present in said solution.

2. The process of claim 1 wherein said resinous polymer is a resinous polyethylene.

3. The process of claim 1 wherein said resinous polymer is a resinous polypropylene.

4. The process of claim 1 wherein said resinous polymer is a copolymer of ethylene and propylene.

5. The process of claim 1 wherein the concentration of polymer in said gel is between about 10 and about 40% by weight and wherein the concentration of polymer in said concentrate is at least 60% by weight.

6. The process of claim 1 which includes the additional steps of subjecting said resinous polymer concentrate to treatment with steam to distill residual hydrocarbon solvent, and recovering an aqueous slurry of purified resinous polymer.

7. A process for separating a resinous polymer of ethylene having a density at 23° C. between about 0.94 and about 0.98 gram per cc. and a melt viscosity at 145° C. between about $10^5$ and about $10^8$ poises from a solution of said polymer in a normally liquid hydrocarbon solvent which solution contains up to 20% by weight, based on the weight of dissolved resinous polymer, of substantially lower molecular weight polymers of ethylene which comprises the steps of cooling said solution to form a polymer gel containing from about 12 to about 25% by weight of said polymer and containing substantially all of the resinous polymer and lower molecular weight polymer initially present in said solution, subjecting said gel to mechanical compression at a pressure of at least about 75 p.s.i.g. and a temperature between about 25° C. and about 75° C. to express a liquid which is a solution of said lower molecular weight polymers in said saturated hydrocarbon solvent, and recovering a concentrate of a resinous polymer of ethylene thus produced containing at least about 50% by weight of said resinous polymer and not more than 3% of said lower molecular weight polymers of ethylene.

8. The process of claim 7 wherein said compression is accompanied by a mechanical shredding of said gel in a continuous mechanical screw press.

9. A process for separating a resinous polymer of a normally gaseous olefin from a solution of said polymer in a normally liquid hydrocarbon solvent which solution contains up to 20% by weight, based on the weight of dissolved resinous polymer, of grease-to-wax like polymer of said olefin preferentially soluble in said solvent, which process comprises the steps of forming from said solution a polymer gel containing substantially all of the resinous polymer and grease-to-wax like polymer contained in said solution, said gel containing from about 5 to about 45% by weight of polymer, subjecting said gel to compression to express therefrom a liquid comprising a solution of said grease-to-wax like polymer in said hydrocarbon solvent and recovering a resinous polymer concentrate thus produced containing above about 50% by weight of said resinous polymer and not more than about 3% of said grease-to-wax like polymer.

10. The process of claim 9 wherein said gel is subjected to compression in a screw-type expeller.

11. The process of claim 9 wherein said gel is subjected to hydraulic compression.

12. The process of claim 9 wherein said gel contains from about 15 to about 35% by weight of polymer.

13. The process of claim 9 wherein said concentrate contains above about 60% by weight of polymer.

No references cited.